(12) United States Patent
Nam

(10) Patent No.: US 7,528,924 B2
(45) Date of Patent: May 5, 2009

(54) LIQUID CRYSTAL DISPLAY AND FABRICATION METHOD THEREOF

(75) Inventor: Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 267 days.

(21) Appl. No.: 11/409,055

(22) Filed: Apr. 24, 2006

(65) Prior Publication Data
US 2006/0189015 A1 Aug. 24, 2006

Related U.S. Application Data

(62) Division of application No. 10/620,596, filed on Jul. 17, 2003, now abandoned.

(30) Foreign Application Priority Data

Dec. 31, 2002 (KR) .............................. 2002-88109

(51) Int. Cl.
*G02F 1/1368* (2006.01)
*G02F 1/1345* (2006.01)

(52) U.S. Cl. ...................... 349/187; 349/43; 349/139; 438/30

(58) Field of Classification Search .............. 349/43, 349/139, 149, 150, 151, 152, 187; 438/30, 438/151; 257/59, 72
See application file for complete search history.

(56) References Cited

U.S. PATENT DOCUMENTS

| 5,311,342 | A | * | 5/1994 | Watanabe | 349/152 |
| 5,825,449 | A | | 10/1998 | Shin | |
| 5,953,094 | A | | 9/1999 | Matsuoka et al. | |
| 6,140,158 | A | * | 10/2000 | Rhee et al. | 438/149 |
| 6,774,969 | B2 | * | 8/2004 | Ma et al. | 349/139 |
| 6,798,442 | B1 | | 9/2004 | Kim et al. | |

* cited by examiner

*Primary Examiner*—Dung Nguyen
*Assistant Examiner*—Tai Duong
(74) *Attorney, Agent, or Firm*—McKenna Long & Aldridge LLP

(57) ABSTRACT

A liquid crystal display includes a first substrate part, a second substrate part, and a sealant for attaching the first substrate part and the second substrate part; a Vcom terminal in the first substrate part and exposed at an edge of a region where the sealant is formed; a common electrode provided in the second substrate part and exposed at an edge of the region where the sealant is formed; and a conductive member provided at an edge of the region where the sealant is formed, for electrically connecting the Vcom terminal with the common electrode.

8 Claims, 7 Drawing Sheets

LIQUID CRYSTAL DISPLAY AND FABRICATION METHOD THEREOF

CROSS-REFERENCE TO RELATED APPLICATIONS

This application is a divisional application of U.S. patent application Ser. No. 10/620,596 filed Jul. 17, 2003; now abandoned which claims priority to Korean Patent Application No. 2002-88109, filed Dec. 31, 2002 which is incorporated by reference for all purposes as if fully set forth herein.

BACKGROUND OF THE INVENTION

1. Field of the Invention

The present invention relates to a liquid crystal display, and more particularly, to a liquid crystal display and fabrication method thereof in which a fabrication process of the liquid crystal display is simplified.

2. Description of the Related Art

Generally, a Braun tube (or cathode ray tube: CRT) has been used most widely among displays for displaying image information until now. However, the CRT causes many inconveniences due to its large size and weight.

Accordingly, a flat panel display that can be used anywhere with ease due to its characteristic having a large display area and a thin thickness at the same time was developed. This flat panel display is replacing the Braun tube display. Especially, a liquid crystal display (LCD) shows characteristics to have an excellent resolution compared with other flat panel displays and a response speed as fast as the CRT in displaying a moving picture.

As well known to those skilled to the art, the operation principle of the LCD is based on the optical anisotropy and polarization property of liquid crystal molecules. Since liquid crystal molecules have a thin elongated structure, it is possible to control the alignment direction of the liquid crystal molecules by artificially applying an electric field.

Hence, if the alignment direction is adjusted arbitrarily, light can be transmitted or shielded according to the alignment direction of liquid crystal molecules due to the optical anisotropy of the liquid crystal molecules, so that the colors and images can be displayed.

Generally, in the liquid crystal display, a first substrate (for example, a thin film transistor substrate) and a second substrate (for example, a color filter substrate) are provided and attached to each other with a predetermined interval therebetween called a cell gap.

Here, the liquid crystal display will be described in more detail. The first substrate (e.g., thin film transistor substrate) includes gate lines and data lines formed on a transparent substrate in a matrix configuration.

A thin film transistor (TFT) functioning as a switching device is formed at each of the cross points of the gate lines and the data lines. A rectangular pixel electrode contacted with the drain electrode of the TFT is formed on a pixel region defined by a pair of gate lines and a pair of data lines.

The second substrate (e.g., color filter substrate) is provided on the other side facing with the transparent substrate on which a plurality of pixel electrodes are formed, includes a black matrix, a color filter layer, and a common electrode formed on a transparent substrate.

If a voltage is applied to one gate line and one data line of the liquid crystal display configured as described above, the thin film transistor (TFT) to which the voltage is applied is turned on. Accordingly, charges are accumulated on the pixel electrode connected to the drain electrode of the turned-on TFT and the alignment of liquid crystal molecules provided between the first substrate and the second substrate is changed.

In the substrate attachment process, the first substrate and the second substrate are attached to form a predetermined cell gap between the first substrate and the second substrate. Subsequently, liquid crystal is injected into an inner space between the first substrate and the second substrate. Thereafter, a process for electrically connecting the first substrate with the second substrate is performed. In this process, sealant, spacer and conductive material are used.

The sealant is a thermosetting resin such as an epoxy resin, and is formed as a seal line along an edge of the first substrate or the second substrate. Here, the sealant serves to attach the two substrates to each other and prevent external materials from being introduced into the liquid crystal layer injected into the cell gap between the two substrates.

The spacer is made of a material such as a plastic ball or a glass fiber and positioned inside the seal line to maintain the interval between the two adhered substrates constantly.

The conductive material is a conductor such as nickel or silver, and is positioned inside the seal line to connect a pad led from the common electrode of the first substrate with the second substrate electrically.

The liquid crystal panel constituting the liquid crystal display will be described.

FIG. 1 is a cross-sectional view exemplarily showing a liquid crystal panel employed to a liquid crystal display according to a related art.

As shown in FIG. 1, an upper substrate 112, such as a color filter substrate, faces with and is spaced from a lower substrate 114, such as an array substrate, by a predetermined distance. Liquid crystal is filled between the upper substrate 112 and the lower substrate 114.

Here, a gate electrode 118 is formed on the transparent substrate 102, such constituting the lower substrate 114, and a gate insulating layer 120 is formed on the entire surface of the transparent substrate including the gate electrode 118. A semiconductor layer 122 including an active layer 122a and an ohmic contact layer 122b is formed on the gate insulating layer 120. A source electrode 124 and a drain electrode 126 are formed on the semiconductor layer 122. A passivation layer 128 including a contact hole 130 is formed on a resultant substrate including the source electrode 124 and the drain electrode 126. A pixel electrode 132 is formed to contact with the drain electrode 126 through the contact hole 130. The pixel electrode 132 behaves one side electrode that applies voltage to the liquid crystal 116.

Here, the gate electrode 118, the semiconductor layer 122, the source electrode 124 and the drain electrode 126 constitute a thin film transistor T.

At a lower portion of a transparent substrate 101 constituting the upper substrate 112, a black matrix 134 is formed at the position corresponding to the thin film transistor T. The R, G, B color filters 136 are formed at the position corresponding to the pixel electrode 132. An overcoat layer 138 is formed at the lower portion of the black matrix 134 and R, G, B color filters 136. A common electrode 140 serving as another electrode is formed at the lower portion of the overcoat layer 138 to apply an electric field to the liquid crystal.

A spacer 142 is placed in an inner space between the common electrode 140 and the pixel electrode 132 to maintain the cell gap that is a distance between the upper substrate 112 and the lower substrate 114 constantly.

A seal pattern 144 is formed at an edge of a liquid crystal display panel 100 to maintain the cell gap constantly like the spacer 142 and attach the upper substrate 112 and the lower substrate 114.

Hereinafter, a fabrication process (such as a 5-mask process) of a lower substrate of a liquid crystal display will be exemplarily described.

First, a predetermined metal layer is deposited on a transparent substrate 102 and patterned using a first mask to form gate lines and gate electrodes 118.

Next, a gate insulating layer 120, an amorphous silicon layer and an impurity-contained amorphous silicon layer are deposited sequentially, and an active layer 122a and an impurity semiconductor layer 122 are formed by a photolithography process using a second mask.

Subsequently, a predetermined metal layer is deposited and patterned using a third mask to form data lines, source electrode 124 and drain electrode 126. Then, the impurity semiconductor layer exposed between the source electrode 124 and the drain electrode 126 is etched to form an ohmic contact layer 122b.

A passivation layer 128 is deposited and patterned using a fourth mask to form a contact hole 130 that exposes a predetermined area of the drain electrode 126.

The passivation layer 128 is formed to prevent a thin film transistor from being damaged or degenerating due to scratch and moisture penetration in a rubbing process of the liquid crystal cell process of the liquid crystal display. The passivation layer 128 is made of silicon nitride (SiNx) or BCB (BenzoCycloButene) that is a kind of organic insulators, etc.

Finally, a transparent conductive material is deposited and patterned using a fifth mask to form a pixel electrode 132 made of transparent conductive material electrically connected to the drain electrode 126 through the contact bole 130.

As this transparent conductive material, indium Tin Oxide (ITO) is mainly used, which has a low contact resistance with metal in a subsequent process or a TAB bonding for the connection with to an external circuit.

The liquid crystal display configured as described above is prepared to print an alignment layer on the upper substrate and the lower substrate and perform a rubbing process so that liquid crystal to be injected is aligned in a predetermined direction. The seal pattern is printed on the upper substrate. The spacers are dispensed on the lower substrate so as to secure a predetermined inner space. A predetermined amount of conductive material is coated on a predetermined position so as to electrically connect the upper substrate and the lower substrate with each other. In general, the conductive material is dotted on an inner area of the printed seal pattern.

FIG. 2 is a schematic view illustrating that the upper substrate is electrically connected to the lower substrate by a conductive material in a liquid crystal display which the substrate attaching process is completed according to a related art.

Referring to FIG. 2, a conductive material 220 is formed by a predetermined amount on a predetermined position of a lower substrate 200, and is coved by to an upper substrate 210. After a TAB boding process, a Vcom terminal 230 of the lower substrate 200 is connected to a common electrode 140 of the upper substrate 210.

In the stack structure of the liquid crystal display manufactured by this fabrication method, the Vcom terminal 230 to be connected to the upper substrate electrically through the conductive material is formed exposed at the uppermost layer of the lower substrate. Accordingly, the conductive material is coated on the exposed Vcom terminal 230 of the lower substrate 200 during the attaching process so that the signal Vcom terminal 230 of the lower substrate 200 can be connected to the common electrode 140 of the upper substrate 210 easily.

On the other hand, researches for substantially reducing the fabrication cost by simplifying the fabrication processes of the liquid crystal display are actively being carried out. In this situation, it is strongly requested to invent a novel fabrication process in which the process for forming a contact hole to connect the pixel electrode to the drain electrode can be omitted.

SUMMARY OF THE INVENTION

Accordingly, the present invention is directed to a liquid crystal display and fabrication method thereof that substantially obviates one or more problems due to limitations and disadvantages of the related art.

An object of the present invention is to provide a liquid crystal display and fabrication method thereof in which a first substrate no needing a contact hole for electrically connecting a pixel electrode and a drain electrode is fabricated and a Vcom terminal of the first substrate is easily connected to a common electrode of a second substrate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for fabricating a liquid crystal display comprises forming a first substrate part having a gate line, a data line, a common voltage terminal, a contact area connected to the common voltage terminal, a thin film transistor and a pixel electrode, the contact area being provided at an edge portion of the first substrate part; forming a second substrate part having a common electrode; attaching the first and second substrate parts to each other to form attached substrates; exposing the contact area at the edge of the first substrate part of the attached substrates; and electrically connecting the contact area of the first substrate part to the common electrode of the second substrate part.

In another aspect of the present invention, a liquid crystal display having a first substrate part, a second substrate part, and a sealant for attaching the first substrate part and the second substrate part, the liquid crystal display comprises a contact area and a common voltage terminal connected to the contact area on the first substrate part, the contact area being exposed at an edge of a region where the sealant is formed, at least a part of the contact area being outside of the sealant; a common electrode on the second substrate part and exposed at an edge of the region where the sealant is formed; and a conductive material electrically connecting the contact area of the first substrate part to the common electrode of the second substrate part.

In another aspect of the present invention, a method for fabricating a liquid crystal display comprises attaching a first substrate part having a contact area and a common voltage terminal, the contact area being connected to the common voltage terminal and a second substrate part having a common electrode to form attached substrates; exposing the contact area provided at an edge portion of the first substrate part by removing an insulating layer over the contact area; and electrically connecting the contact area of the first substrate part to the common electrode of the second substrate part.

In another aspect of the present invention, a method of fabricating a liquid crystal display includes forming a first substrate part provided with a gate line, a data line, a Vcom terminal, a thin film transistor and a pixel electrode; forming a second substrate part provided with a color filter array and a common electrode; attaching the first and second substrate parts to each other; exposing the Vcom terminal provided in an edge of the first substrate part of the attached substrates; and coating a conductive material at a side edge portion of the attached substrates such that the Vcom terminal of the first substrate part is electrically connected with the common electrode of the second substrate part.

In another aspect of the present invention, a liquid crystal display includes a first substrate part, a second substrate part, and a sealant for attaching the first substrate part and the second substrate part. The liquid crystal display includes a Vcom terminal provided in the first substrate part and exposed at an edge of a region where the sealant is formed; a common electrode provided in the second substrate part and exposed at an edge of the region where the sealant is formed; and a conductive member provided at an edge of the region where the sealant is formed, for electrically connecting the Vcom terminal with the common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

FIGS. 3A to 3E are sectional views illustrating a process for forming a lower substrate in a fabrication method of an LCD according to the present invention.

Figure 1:
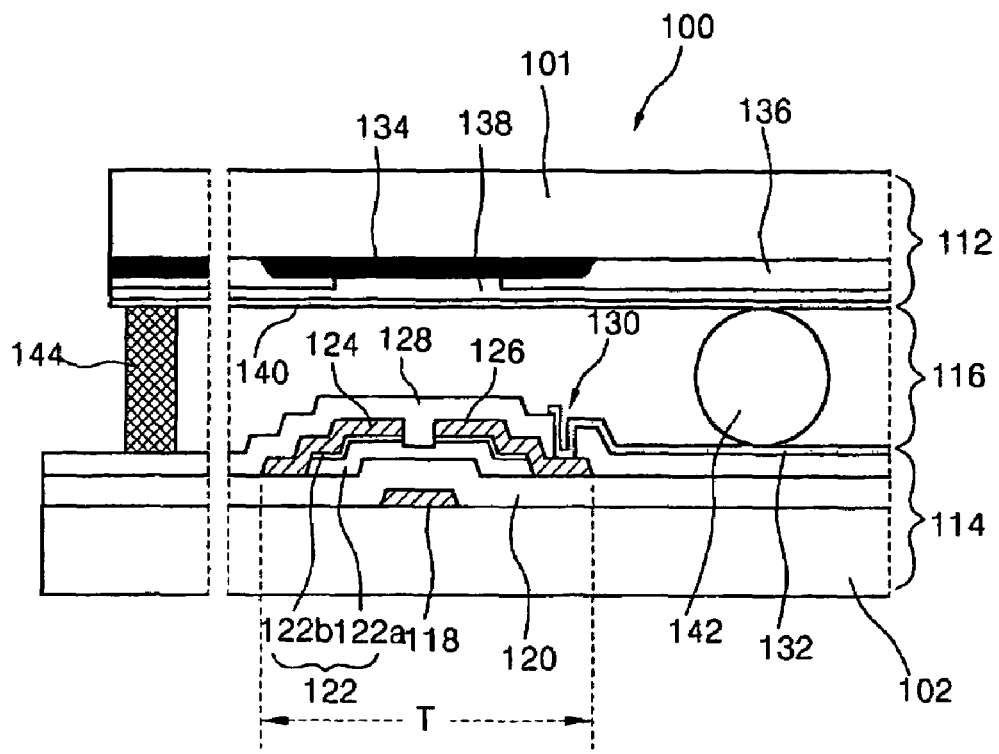
FIG. 1 is a sectional view exemplarily showing an LCD panel employed to a liquid crystal display according to a related art.
Figure 2:
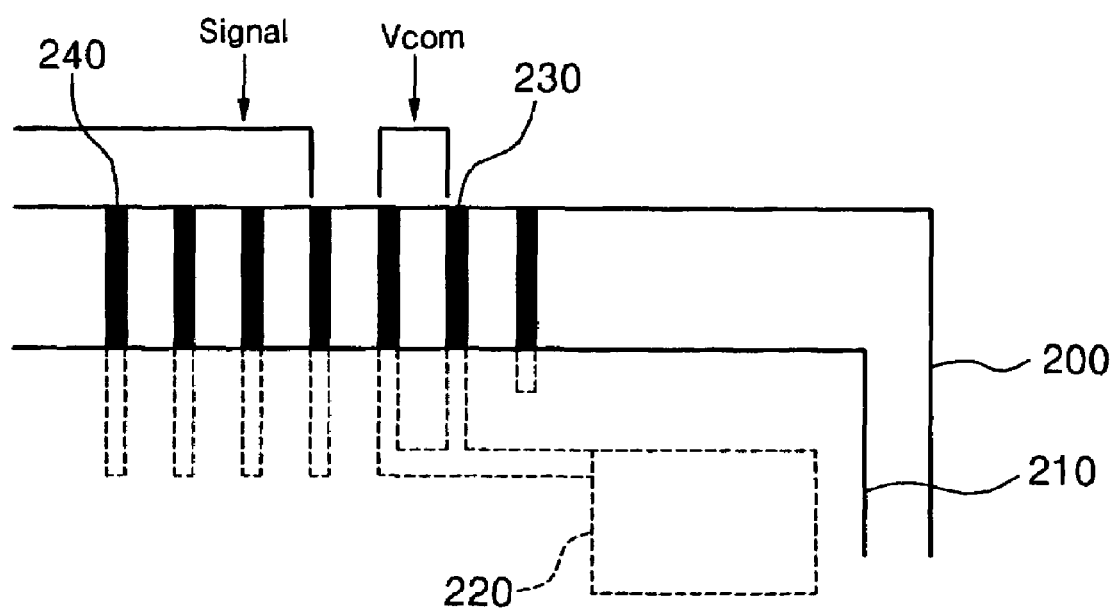
FIG. 2 is a schematic view showing a state that an upper substrate and a lower substrate are electrically connected by a conductive member in a liquid crystal display in which the substrate attaching process is completed according to a related art.
Figure 3A:
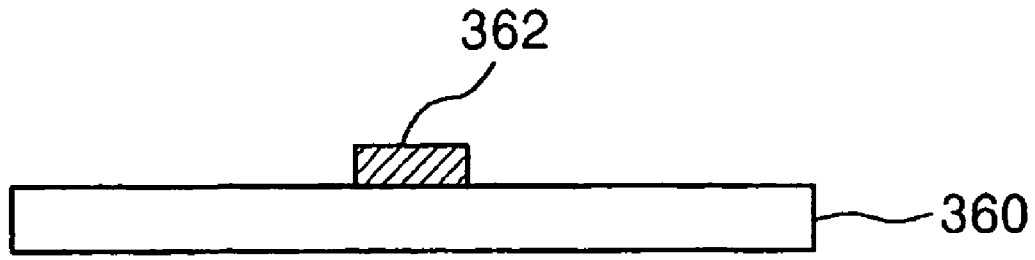
FIGS. 3A to 3E are sectional views illustrating a process for forming a lower substrate in a fabrication method of an LCD according to the present invention.

Referring to FIG. 3A, a gate electrode 362 is formed on a transparent insulating substrate 360. Here, the gate electrode 362 is formed along with a gate line by depositing a metal film on the transparent insulating substrate 360, patterning the deposited metal film by a photolithography process, and performing an etch process. In the step of forming the gate electrode 362, a first mask is used and a wet etch is used for the etch process.

The gate electrode 362 is made of aluminum (Al), copper (Cu) or chromium (Cr), and a solution of $(NH_4)_2S_2O_8$ is used as an etch solution for the wet etch.

Figure 3B:
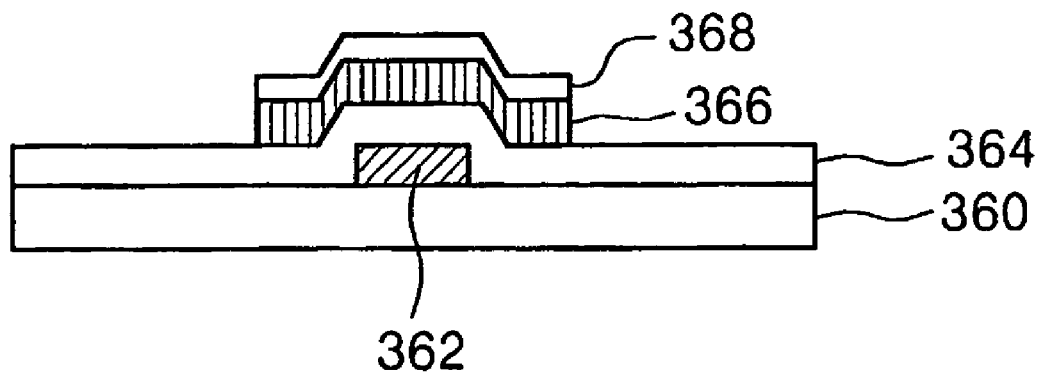

Subsequently, as shown in FIG. 3B, a gate insulating film 364, an active layer 366, and an ohmic contact layer 368 are sequentially formed on the transparent insulating substrate on which the gate electrode 362 is formed. For the above process, a second mask is used.

The gate insulating film 364 is formed by depositing an insulating material such as silicon nitride (SiNx) or silicon oxide (SiOx) on the transparent substrate 360. An amorphous silicon layer (a-Si) and an impurity-doped amorphous silicon layer (n+a-Si) are sequentially deposited on the gate insulating film 364.

The amorphous silicon layer (a-Si) and the impurity-doped amorphous silicon layer (n+a-Si) are patterned by a photolithography process including an etch process to form an active layer 366 and an ohmic contact layer 368. A dry etch is mainly used for the photolithography process.

Figure 3C:
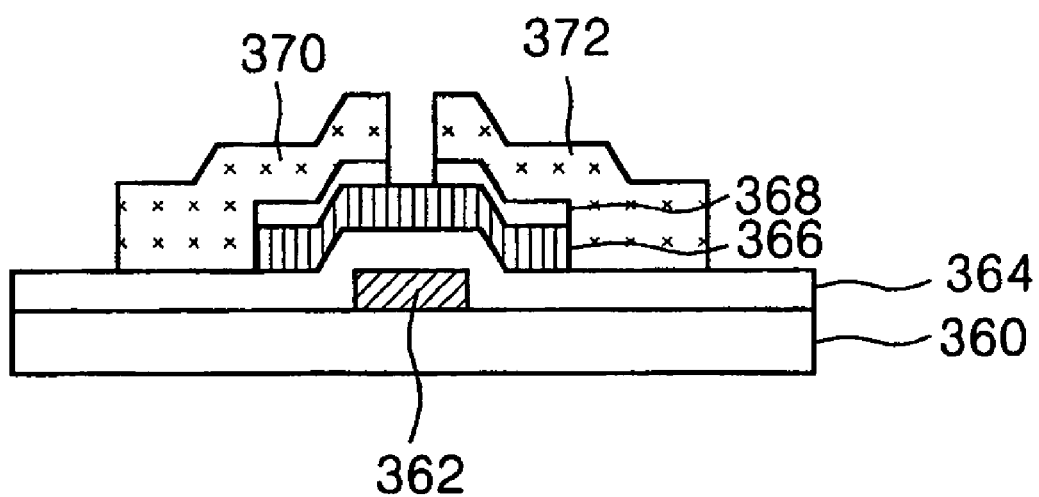

As shown in FIG. 3C, a source/drain electrode 370/372 is formed on the ohmic contact layer 368 by using a third mask.

The source and drain electrodes 370 and 372 are formed by depositing a metal layer using a sputtering method on the gate insulating film 364 layer and covering the ohmic contact layer 368 and patterning the deposited metal layer by a photolithography process. A wet etch is preferably used for the photolithography process.

Here, the source and drain electrodes 370 and 372 may be formed with molybdenum (Mo), and an alloy containing molybdenum, for instance, MoW, MoTa or MoNb. As an etch solution, $(NH_4)_2S_2O_8$ may be used.

Figure 3D:
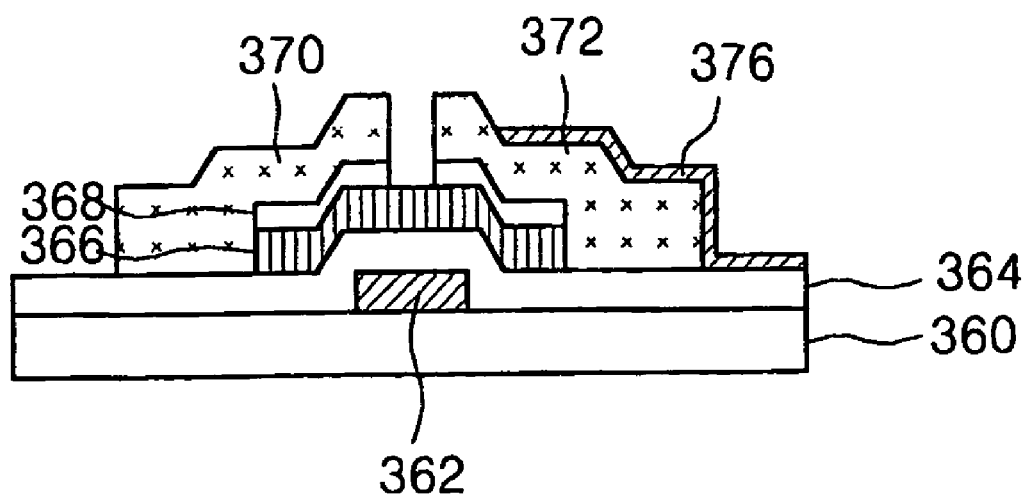

Next, as shown in FIG. 3D, a transparent conductive material of ITO, IZO, ITZO or the like is deposited on a resultant substrate including the source and drain electrodes 370 and 372 and is patterned to form a pixel electrode 376. A fourth mask is used to form the pixel electrode 376.

Figure 3E:
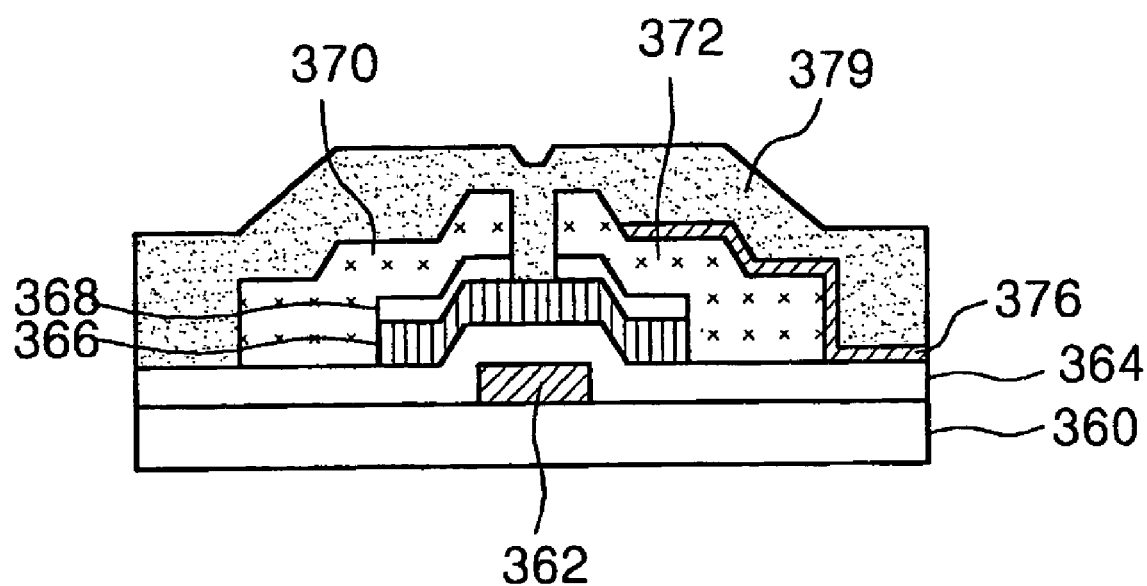

Next, as shown in FIG. 3E, a passivation layer 379 is formed on an entire surface of a resultant substrate including the gate insulating film 364, the source electrode 370, the drain electrode 372 and the pixel electrode 376. Thus, the passivation layer 379 is formed above the pixel electrode 376 in the fabrication method of an LCD according to the present invention.

The passivation layer 379 is formed by depositing an insulating layer on the entire surface of the resultant substrate. The passivation layer 379 is made of, for instance, an inorganic insulator such as silicon nitride (SiNx) or silicon oxide (SiOx), or an organic insulator having a low dielectric constant, such as acryl-based organic compound, Teflon, BCB (BenzoCycloButene), cytop or PFCB (Perfluorocyclobutane).

An LCD fabrication method has been described using four masks without the need to form a contact hole to electrically connect the pixel electrode to the drain electrode. However, by using a diffraction exposure technique in which a mask is patterned in the form of slits spaced apart by a predetermined interval, it is possible to realize an LCD fabrication process that does not need a contact hole forming process through a three mask process. In other words, by using the diffraction exposure technique, the process for forming the active layer and the ohmic contact layer and the process for forming the source/drain electrode can be performed at the same time, thereby simplifying the fabrication process. Since the diffraction exposure technique is well known to those skilled in the art, its detailed description will be omitted.

Figure 4A:
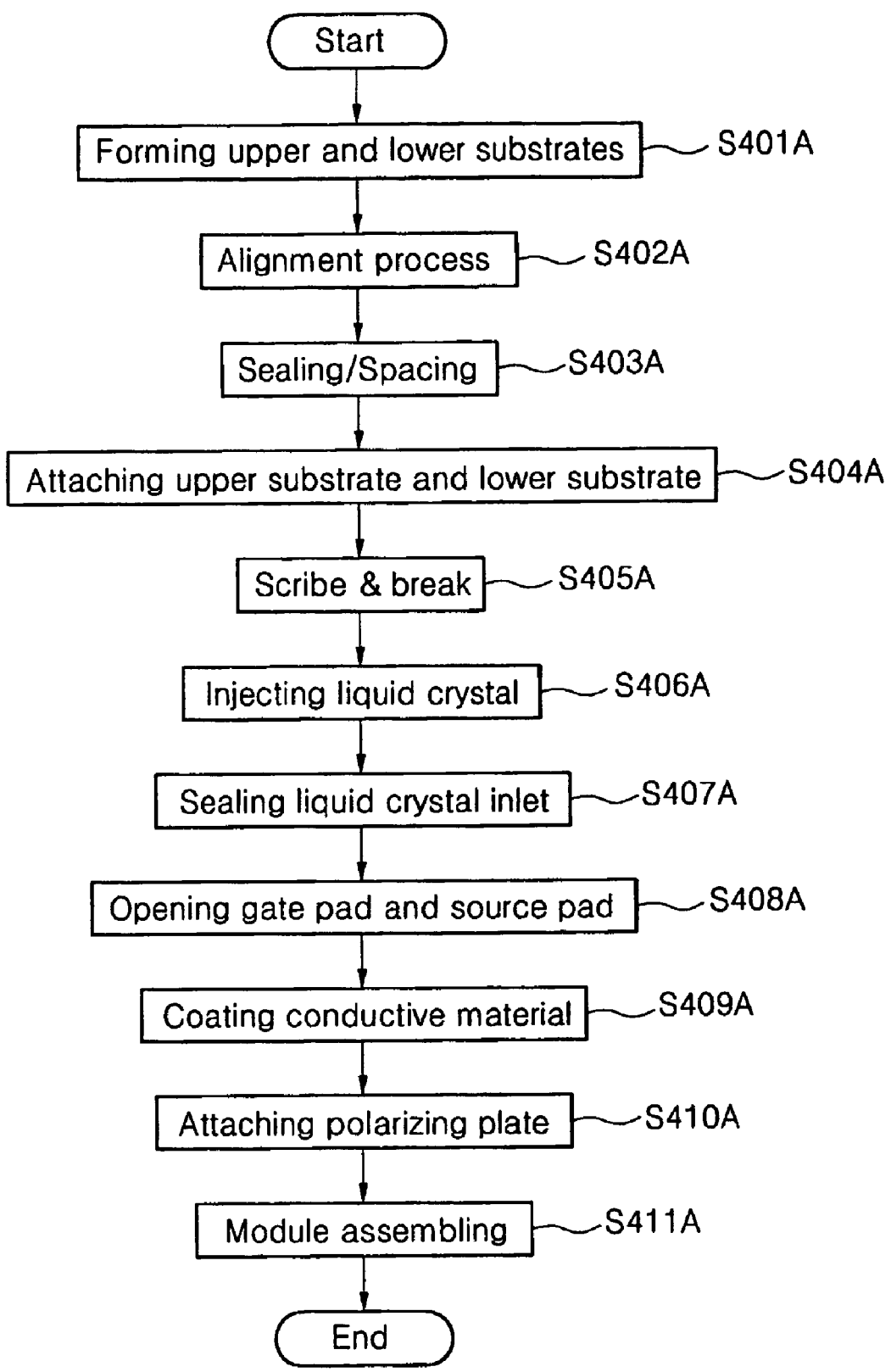
FIG. 4A is a process flowchart illustrating a method for fabricating an LCD in accordance with an embodiment of the present invention.
Figure 4B:
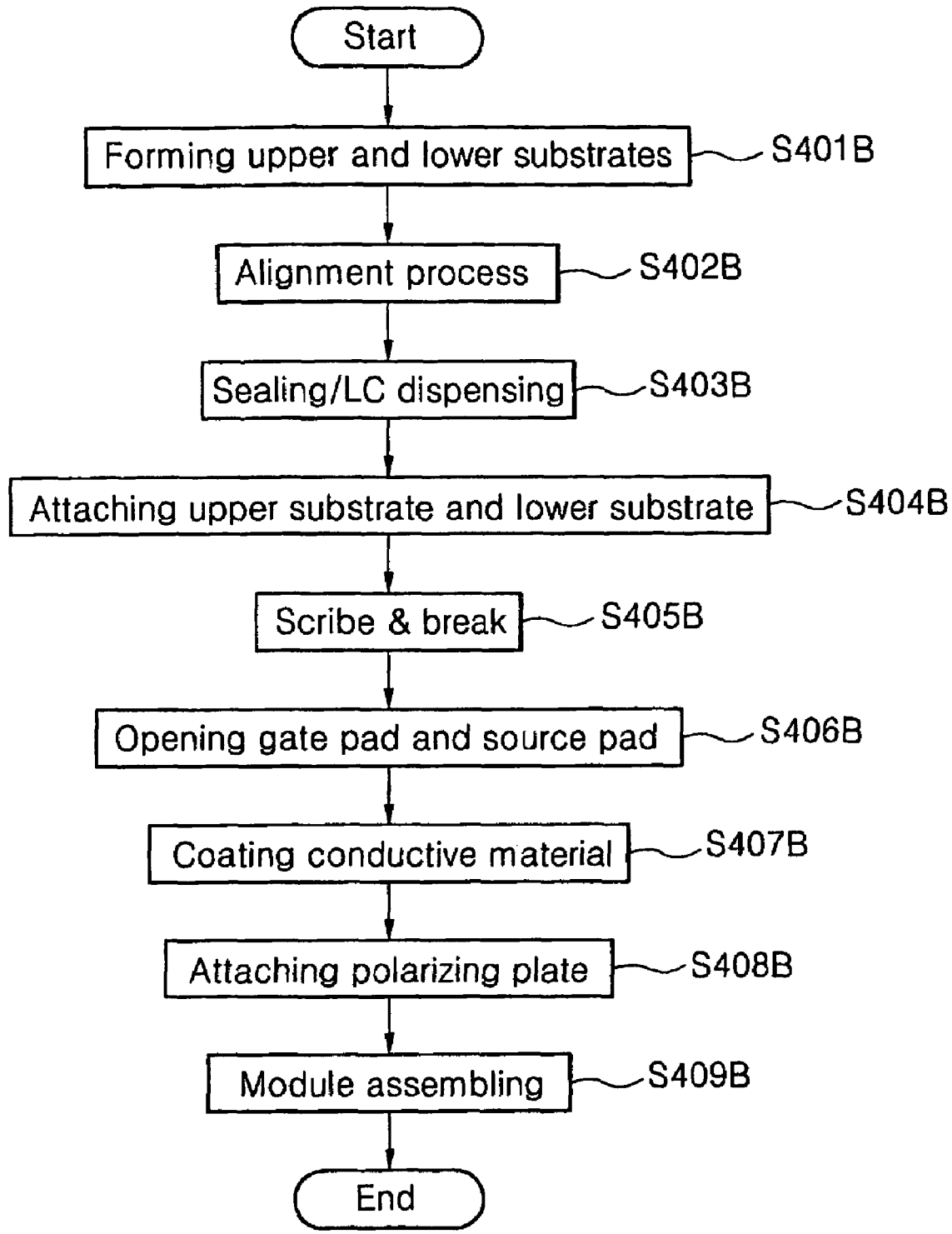
FIG. 4B is a process flowchart illustrating a method for fabricating an LCD in accordance with another embodiment of the present invention.

In the LCD fabrication method of the present invention, a substrate forming process, a cell forming process, and a module forming process will be described with reference to FIGS. 4A and 4B. FIG. 4A is a process flowchart illustrating a method for fabricating an LCD according to an embodiment of the present invention. FIG. 4B is a process flowchart illustrating a method for fabricating an LCD according to another embodiment of the present invention.

Generally, the LCD fabrication process can be classified into a substrate forming process, a cell forming process, and a module forming process.

Referring to FIG. 4A, the substrate forming process is divided into a lower substrate forming process and an upper substrate forming process in which a glass substrate is used for both the lower and upper substrates, for example. (S401A)

As described above with reference to FIGS. 3A to 3E, the lower substrate forming process is usually a process for forming a thin film transistor array having a gate line, a data line, a thin film transistor and a pixel electrode. Also, the upper substrate forming process indicates a process for forming a color filter array in which an R, G, B color filter layer is formed by using a dye or a pigment on an upper glass substrate having a black matrix formed thereon and a common electrode is formed on an entire surface of a resultant upper glass substrate including the color filter layer.

Referring to FIG. 4A, the cell forming process can be generally divided into an alignment process (S402A) for alignment of liquid crystal molecules, a sealing and spacing process (S403A), a substrate attaching process (S404A), a scribe & break process (S405A), a gate pad & source pad opening process (S406A), a conductive material coating process (S407A), a liquid crystal injecting process (S408A) and a liquid crystal injection inlet sealing process (S409A).

Alternatively, referring to FIG. 4B, the cell forming process can be divided into an alignment process (S402B), sealing/LC dispensing process (S403B), a substrate attaching process (S404B), a scribe and break (or cut) process (S405B), a gate pad and source pad opening process (S406B), and a conductive material coating process (S407B). This alternative process can be a simpler process if the liquid crystal is dispense or dropped onto one of the substrates prior to attachment.

Hereinafter, the aforementioned processes will be described in more detail.

The alignment process (S402A, S402B) includes the steps of: forming an alignment layer. The alignment layer may undergo a rubbing or UV exposure process. The alignment process allows the liquid crystal molecules to be uniformly aligned for a normal liquid crystal operation and have a uniform display characteristic. The alignment process is carried out on both of the lower substrate and the upper substrate. For different LCD modes such as the vertical alignment (VA) mode, the alignment treatment process may or may not be needed.

The sealing and spacing process (S403A) includes the steps of dispensing spacers so as to maintain a constant interval between the lower substrate and the upper substrate, and coating a sealant.

After the sealing and spacing process (S403A), the substrate attaching process (S404A, S404B) attaches the lower substrate and the upper substrate, and the scribe and break process (S405A, S405B) cuts the attached substrates into a plurality of panels or cells (i.e., LCD panels).

Then, as described with reference to FIGS. 3A to 3E, the insulating layer is formed at the uppermost layer of the lower substrate. To this end, in order to externally apply a driving signal, it is necessary to carry out a process (S406A, S406B) of opening the gate pad and the source pad formed on the lower substrate. In the gate pad and source pad opening process (S406A, S406B), the Vcom terminal formed on the lower substrate is also opened along with the gate pad and the data pad.

According to the LCD fabrication method of the present invention, the opening process of the gate pad and the source pad of the lower substrate is not carried out during the substrate forming process but is carried out during the panel or cell forming process, especially after the attached substrates are cut into a plurality of panels or cells.

The opening process for opening the gate pad, the source pad and the Vcom terminal in the separated cells can be carried out by dipping a side portion of the separated cell in an etching solution. Thus, in order to open the gate pad, the source pad and the Vcom terminal, it is desirable that the gate pad, the source pad and the Vcom terminal be formed at an edge of the lower substrate during the fabrication process of the lower substrate.

Subsequently, the conductive material coating process (S409A, S407B) is carried out such that the Vcom terminal of the lower substrate is electrically connected with the common electrode of the upper substrate. The conductive material coating process (S409A, S407B) will be described with reference to FIGS. 5 and 6.

Referring specifically to FIG. 4A, the liquid crystal injecting process (S408A) for injecting liquid crystal into a space between the attached substrates of the cell by a capillary phenomenon and a pressure difference is performed. A liquid crystal injection inlet sealing process (S407A) for sealing the liquid crystal injection inlet to prevent the injected liquid crystal from leaking is carried out.

Afterwards, a polarizing plate attaching process (S410A, S408B) for attaching polarizing plates on both outer surfaces of the cell is additionally carried out.

Then, a module assembly process (S411A, S409B) is carried out in which the LCD panel is electrically connected to a signal processing circuit.

Through the aforementioned series of fabrication processes, an LCD fabricated according to the fabrication method of the invention is completed.

Figure 5:
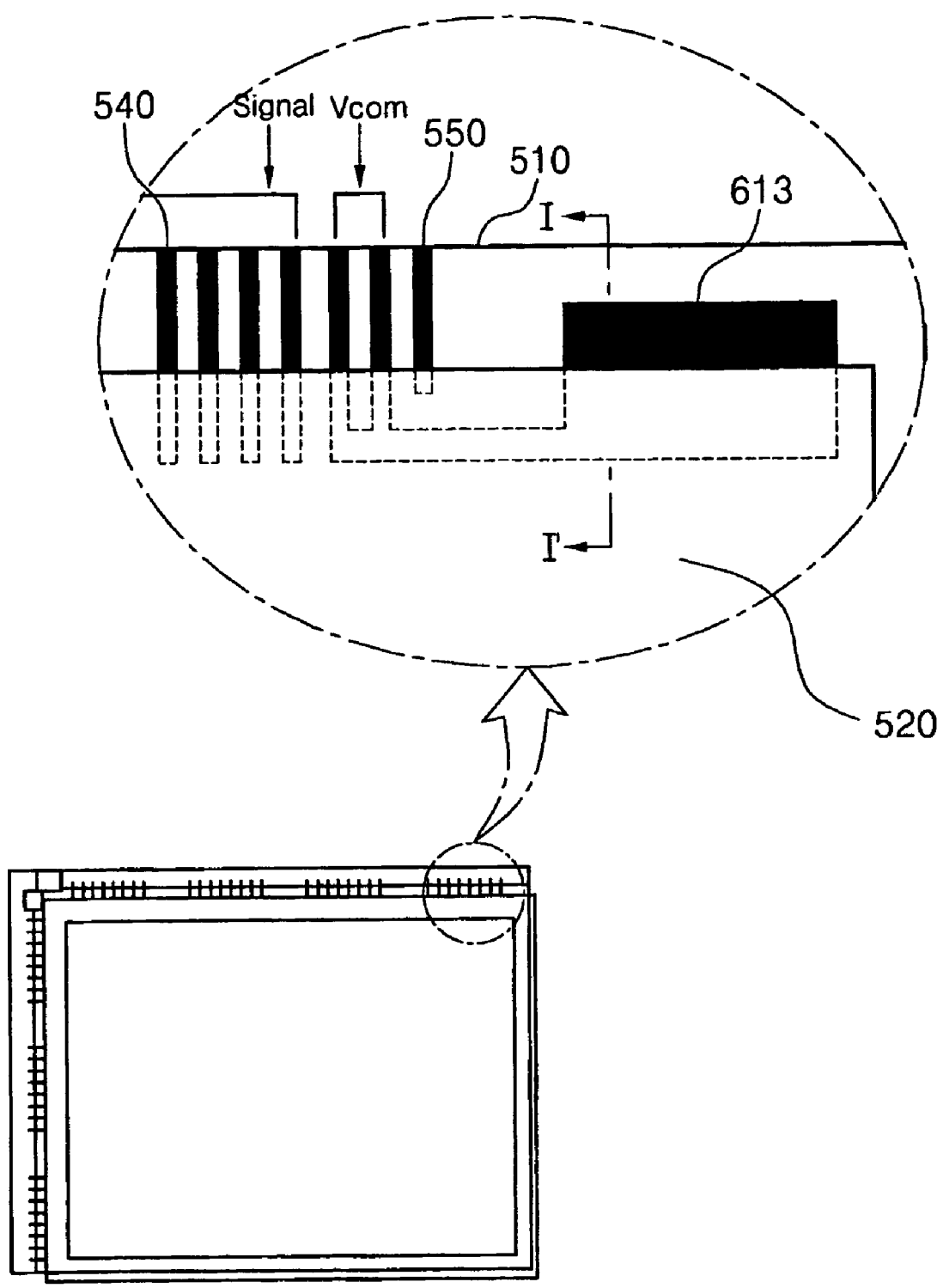
FIG. 5 is a schematic view showing a state that an upper substrate and a lower substrate are electrically connected by a conductive member in a liquid crystal display according to the present invention.
Figure 6:
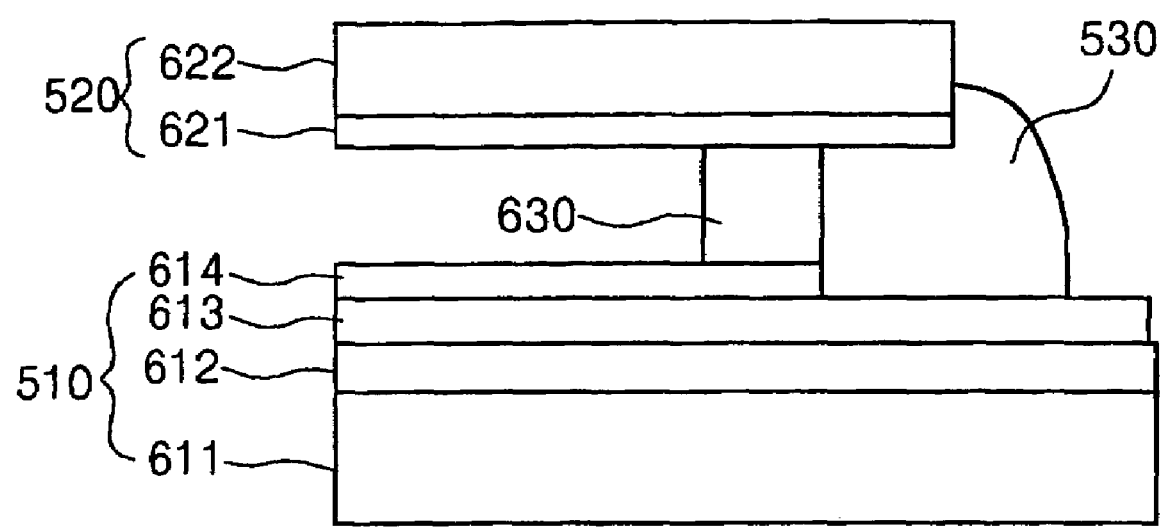
FIG. 6 is a sectional view taken along the line I-I' of FIG. 5.

Next, the conductive material coating process (S409A, S407B) for transmitting the Vcom signal of the lower substrate to the common electrode of the upper substrate will be described in more detail with reference to FIGS. 5 and 6. FIG. 5 is a schematic view showing an upper substrate and a lower substrate that are electrically connected by a conductive member in a liquid crystal display according to the present invention. FIG. 6 is a sectional view taken along the line I-I' of FIG. 5.

As shown in FIGS. 5 and 6, a gate insulating layer 612, a Vcom terminal 550, and a passivation layer 614 are stacked at an edge area of the lower substrate part 510. In the upper substrate part 520, a common electrode 621 is formed on an inner surface of an upper substrate 622 made of glass, for example. The lower substrate part 510 and the upper substrate part 520 are attached to each other by a sealant 630. In the drawings, a reference numeral 530 indicates a conductive material.

The gate insulating layer 612 is formed on a lower substrate 611 made of glass, for example, and the Vcom terminal 550 extends to an edge outside the sealant 630. In addition, the passivation layer 614, which is an insulator, is arranged on a contact area 613 and is preferably formed only within the sealant 630. Such a configuration of the passivation layer 614 is from the fact that the passivation layer 614 is etched by dipping a side portion of the attached cell in an etching solution to expose the Vcom terminal 613 of the lower substrate part 510.

After the passivation layer 614 is etched to expose the contact area 613 of the lower substrate part 510, a conductive material 530 is coated on the side portion of the LCD cell such that the contact area 613 of the lower substrate part 510 is electrically connected to the common electrode 621 of the upper substrate part 520. Here, the conductive material 530 can include a conductive paste, or a conductive film of nickel (Ni) or silver (Ag), for example.

A signal processing circuit for driving the LCD is connected to the Vcom terminal 550 and the signal input terminal 540 shown in FIG. 5. Thus, while the passivation layer is formed at an upper layer of the lower substrate part, the process of exposing the gate pad, the source pad and the Vcom terminal is in the cell forming process, so that the LCD can be operated normally.

As described previously, according to an LCD fabrication method of the present invention, a process for forming the contact hole for electrically connecting the pixel electrode with the drain electrode is unnecessary, which simplifies the LCD fabrication process.

The embodiment of the present invention describes a process of exposing the gate pad, the source pad, the Vcom terminal and the contact area by removing the passivation layer of a corresponding region by, for example, dipping a side portion of an attached LCD cell. Alternatively, the passivation layer can be removed by an atmospheric pressure plasma etching process in which plasma is supplied to a corresponding region of the passivation layer through a nozzle, or a laser etching process in which laser beam is irradiated at a corresponding region of the passivation to remove the passivation layer.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a liquid crystal display comprising:

forming a first substrate part having a gate line, a data line, a common voltage terminal, a contact area connected to the common voltage terminal, a thin film transistor and a pixel electrode, the contact area being provided at an edge portion of the first substrate part;

forming a second substrate part having a common electrode;

attaching the first and second substrate parts to each other to form attached substrates;

exposing the contact area at the edge of the first substrate part of the attached substrates; and electrically connecting the contact area of the first substrate part to the common electrode of the second substrate part, wherein forming the first substrate comprises:

forming a gate electrode and a gate line in a first direction on a substrate;

forming a first insulating layer over the substrate;

forming an active layer and an ohmic contact layer at a region on the insulating layer, the region corresponding to an area above the gate electrode;

forming source and drain electrodes on the ohmic contact layer and a data line in a second direction normal to the first direction;

forming a pixel electrode at least partially overlapped with and electrically connected with the drain electrode; and forming a second insulating layer over the substrate including the pixel electrode, wherein only three masks are used to form the gate electrode, the first insulating layer, the active layer, the ohmic contact layer, the source and drain electrodes, the pixel electrode and the second insulating layer.

2. The method according to claim 1, wherein the exposing step comprises using an etch solution to remove the second insulating layer formed over the contact area.

3. The method according to claim 2, wherein a side portion of the attached substrates is dipped into the etch solution to remove the second insulating layer over the contact area.

4. The method according to claim 1, wherein electrically connecting the contact area to the common electrode uses a conductive material.

5. The method according to claim 1, wherein the exposing step comprises etching and removing the second insulating layer formed over the contact area by using a laser.

6. The method according to claim 1, wherein the exposing step comprises etching and removing the second insulating layer formed over the contact area by using plasma.

7. The method according to claim 1, wherein the step of forming the active layer, the ohmic contact layer and the source and drain electrodes are performed using one mask.

8. The method according to claim 1, wherein the second insulating layer is a passivation layer.

* * * * *